(12) United States Patent
Alvin

(10) Patent No.: US 7,740,948 B1
(45) Date of Patent: Jun. 22, 2010

(54) THERMAL BARRIER COATINGS

(75) Inventor: Mary Anne Alvin, Pittsburg, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 456 days.

(21) Appl. No.: 11/756,049

(22) Filed: May 31, 2007

Related U.S. Application Data

(60) Provisional application No. 60/811,146, filed on May 31, 2006.

(51) Int. Cl.
*B32B 9/00* (2006.01)

(52) U.S. Cl. .................. 428/469; 428/472; 428/701; 428/702; 416/241 B

(58) Field of Classification Search .................. None
See application file for complete search history.

(56) References Cited

U.S. PATENT DOCUMENTS

| | | | |
|---|---|---|---|
| 4,321,310 A | 3/1982 | Ulion et al. | |
| 4,321,311 A | 3/1982 | Strangman | |
| 5,238,752 A | 8/1993 | Duderstadt et al. | |
| 5,863,668 A * | 1/1999 | Brindley et al. | ............. 428/612 |
| 5,981,091 A | 11/1999 | Rickerby et al. | |
| 6,210,812 B1 * | 4/2001 | Hasz et al. | .................. 428/621 |
| 6,394,755 B1 * | 5/2002 | Stowell et al. | .......... 416/241 R |
| 6,558,814 B2 * | 5/2003 | Spitsberg et al. | ............ 428/633 |

OTHER PUBLICATIONS

M. Kamaraj, *Rafting in Single Crystal Nickel-Base Superalloys, An Overview*, Sadhana, vol. 28. Parts 1&2, Feb./Apr. 2003, pp. 115-128.

\* cited by examiner

*Primary Examiner*—Timothy M Speer
(74) *Attorney, Agent, or Firm*—James B. Potts; Mark P. Dvorscak; Paul A. Gottlieb

(57) ABSTRACT

This disclosure addresses the issue of providing a metallic-ceramic overlay coating that potentially serves as an interface or bond coat layer to provide enhanced oxidation resistance to the underlying superalloy substrate via the formation of a diffusion barrier regime within the supporting base material. Furthermore, the metallic-ceramic coating is expected to limit the growth of a continuous thermally grown oxide (TGO) layer that has been primarily considered to be the principal cause for failure of existing TBC systems. Compositional compatibility of the metallic-ceramic with traditional yttria-stabilized zirconia (YSZ) top coats is provided to further limit debond or spallation of the coating during operational use. A metallic-ceramic architecture is disclosed wherein enhanced oxidation resistance is imparted to the surface of nickel-based superalloy or single crystal metal substrate, with simultaneous integration of the yttria stabilized zirconia (YSZ) within the metallic-ceramic overlayer.

20 Claims, 4 Drawing Sheets

Architecture of the metallic-ceramic oxidation resistant layer.

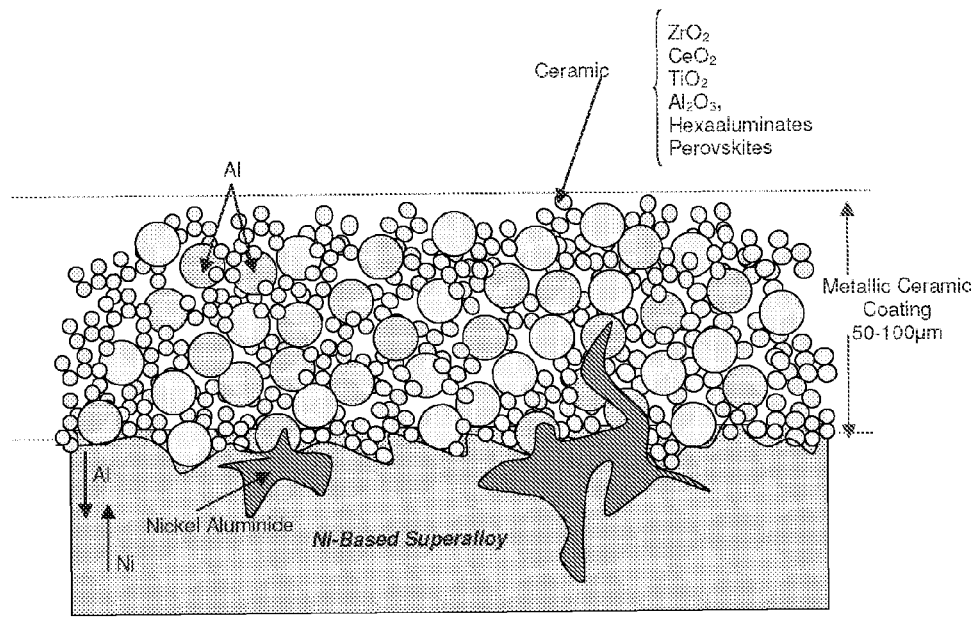
Figure 1 — Architecture of the metallic-ceramic oxidation resistant layer.
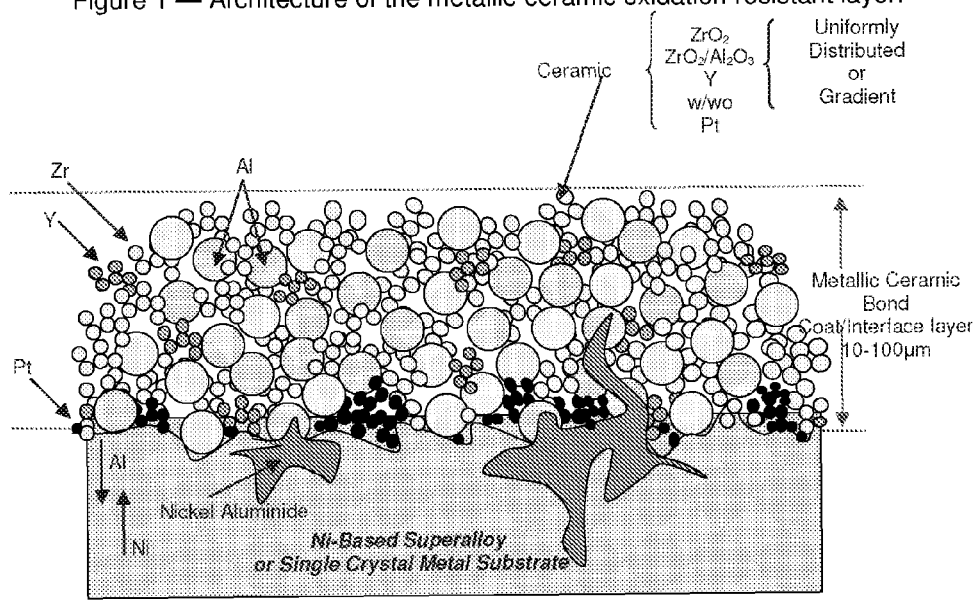
Figure 2 — Architecture of the metallic-ceramic layer that serves as a TBC bond coat layer of the invention.

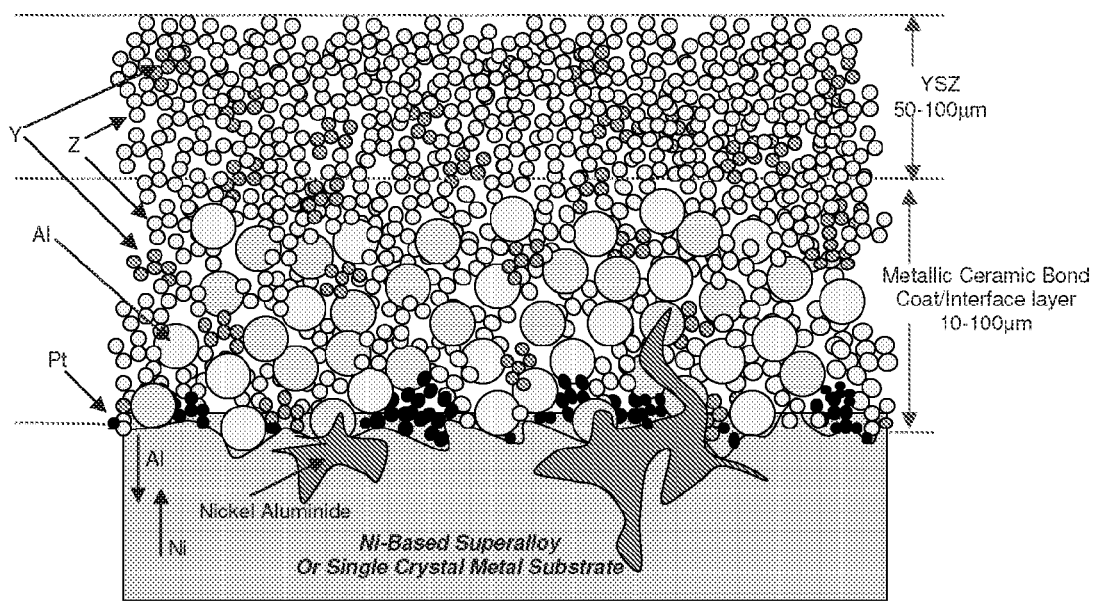
Figure 3 — Architecture of the TBC Coating.

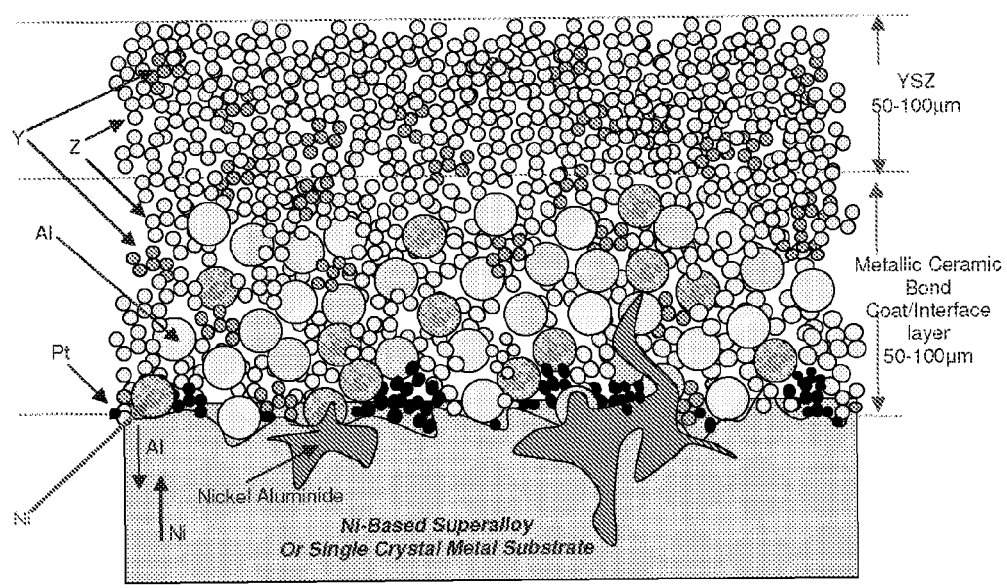
Figure 4 — Additional disclosed TBC architectures. Alternately, platinum can be homogeneously dispersed throughout or included as a gradient within the bond coat.

THERMAL BARRIER COATINGS

This application claims priority from provisional application 60/811,146 filed May 31, 2006.

STATEMENT REGARDING FEDERALLY SPONSORED RESEARCH OR DEVELOPMENT

The United States Government has rights in this invention through an employer/employee relationship with the inventor.

FIELD OF THE INVENTION

The invention relates to metal coatings to protect the substrate from exposure to high temperatures and corrosive environments. More specifically, this invention relates to a thermal barrier coating for use on gas turbine blades and the like for protection from high temperatures and corrosive environments.

BACKGROUND OF THE INVENTION

Increasing the power efficiency of stationary land-based industrial gas turbines will require future turbine inlet temperatures to increase to >1400° C. Cooling air will simultaneously need to be controlled to avoid an increase in $NO_x$ emissions. Similarly the concept of ultra low or "zero" emission power generation has focused on an oxy-fuel combustion process in which nitrogen is removed in the combustion air, and replaced with steam, thereby preventing the formation of nitrogen oxides. The exhaust stream of the oxy-fuel process is separated into concentrated $CO_2$ and water. Alternately, hydrogen-fueled combustion turbine systems are conceptually based on a complex cycle composed of a closed Brayton cycle and a Rankine cycle. Hydrogen and oxygen are supplied as the fuel and oxidant respectively to a compressor, and burned in steam. The pressurized steam feed enters a high temperature turbine at 1700° C.

As increased efficiencies are sought in electric power generation, turbine-based power generation systems are increasingly required to operate under extreme conditions. The standard operating environment within a turbine is typically thermally and chemically hostile to materials used to form turbines and turbine components. As higher operating temperatures for gas turbine engines are continuously sought after in order to increase turbine efficiencies, which also increases the thermal and mechanical stresses placed on turbine materials. Therefore, as operating stresses increase, the high temperature durability of the components within the hot gas path of the engine must correspondingly increase. Significant advances in high temperature capabilities have been achieved through the formulation of nickel and cobalt-base superalloys. Nonetheless, when used to form components of the turbine, combustor and augmentor sections of a gas turbine engine, such alloys alone are often susceptible to damage by oxidation and hot corrosion attack, and as a result may not retain adequate mechanical properties. For this reason, these components are often protected by a thermal barrier coating (TBC) system.

In order to successfully achieve long-term operation, higher operating temperature industrial land-based gas turbines will require internal blade cooling, potential utilization of advanced high temperature superalloys, and the incorporation of stable thermal barrier coating (TBC) systems. The following sections provide a brief overview of the current technology base.

Thermal Barrier Coating Systems

Industrial gas turbine engine components must withstand extreme temperatures, thermal cycling, and stress conditions. Current TBC systems consist of four layers, each consisting of different materials with specific properties and functions. These include the superalloy substrate, the bond coat, the thermally grown oxide layer (TGO), and the ceramic top coat.

Superalloy Materials

A superalloy or high performance metallic alloy is an alloy with superior mechanical strength, good surface stability, corrosion resistance, and is a material that can withstand high temperatures without oxidizing or losing mechanical properties. Creep and oxidation resistance are the prime design criteria for use of these materials. Superalloys are iron-, cobalt-, or nickel-based, the latter being suited for aeroengine applications. Many other elements can be present within the superalloy matrix. These include chromium (Cr), molybdenum (Mo), tungsten (W), aluminum (Al), zirconium (Zr), niobium (Ni), rhenium (Re), carbon (C), or silicon (Si).

Superalloys can be used at high temperatures, often in excess of 0.7 of the absolute melting temperature of the alloy. Nickel-based single crystal (SC) superalloys exhibit superior high temperature mechanical strength (at temperature >85% of their melting points), and hot corrosion resistance compared to conventional alloys (M. Kamaraj, "Rafting in single crystal nickel-base superalloys—an overview", Sahana, Vol. 28, Parts 1 &2, February/April 2003, pp. 115-128).

The essential solutes in nickel-based superalloys are aluminum and/or titanium, with a total concentration that is typically less than 10 atomic percent. This generates a two-phase equilibrium microstructure consisting of gamma ($\gamma$) and gamma prime ($\gamma'$). The $\gamma'$ phase is largely responsible for elevated temperature strength of the material, and its resistance to creep deformation. The strength of most metals is known to decrease as operating temperature is increased. In contrast, nickel-based superalloys containing the intermetallic $\gamma'$ compound are relatively insensitive to temperature.

Additions to commercial nickel-based superalloys include aluminum (Al) and titanium (Ti), chromium (Cr) small quantities of yttrium (Y) boron (B) or zirconium (Zr), and carbide formers C, Cr, Mo, W, Nb, Ta, Ti, and Hf can also be present. Carbides tend to precipitate at grain boundaries and reduce the tendency for grain boundary sliding. Elements such as cobalt (Co), iron (Fe), chromium (Cr), niobium (Nb), tantalum (Ta), molybdenum (Mo), tungsten (W), vanadium (V), titanium (Ti), and aluminum (Al) are known to be solid-solution strengtheners, both in $\gamma$ and $\gamma'$ phases.

Currently nickel-based SC superalloys are identified for the manufacture of critical components as turbine blades, vanes for aircraft, as well as land-based power generation applications. Microstructure, chemical composition, and high temperature mechanical properties are the major factors controlling the performance of SC superalloys.

Bond Coat—Diffusion Barrier Coatings & Overlayer Coatings

TBC systems typically include an environmentally-protective bond coat and a thermal-insulating topcoat, typically referred to as the TBC. Bond coat materials widely used in TBC systems include oxidation-resistant overlay coatings such as MCrAlX (where M is iron, cobalt and/or nickel, and X is yttrium or another rare earth or reactive element) as discussed in U.S. Pat. No. 4,321,310 and U.S. Pat. No. 4,321,311, and oxidation-resistant diffusion coatings such as diffusion aluminides that contain nickel-aluminum (NiAl) intermetallics as discussed in U.S. Pat. No. 5,238,752.

A bond coat is typically applied to the external surface of the superalloy to facilitate growth of a resistant oxide layer. The bond coat is the transition layer onto which the TBC topcoat is applied and adheres. Alumina ($\alpha$-$Al_2O_3$) or an alumina-former is typically selected as a bond coat matrix as alumina offers excellent oxidation protection and has a very low growth rate. The two most widely used types of bond coatings are alumina-based matrices (Al/$Al_2O_3$), and MCrAlY where M=Fe and/or Ni. The former is obtained by surface enrichment (i.e., diffusion; see discussion below), while the later is achieved by plasma spray or electron beam physical vapor deposition (EB PVD). With the concept of introducing a diffusion barrier onto the surface of superalloys, the invention of Pt-aluminide coatings resulted. Platinum is typically electroplated to thicknesses of 5-10 µm. In low activity/outward diffusion coatings, the alloying elements present in the substrate (i.e., Ni) will tend to diffuse into the coating layer, to an extent limited by their solubility. In high activity/inward diffusion coatings, elements in solution enter the compound layer being formed, or form precipitates during processing.

In contrast, overlay coatings as opposed to diffusion coatings provide more independence from the substrate alloy, and also have more flexibility in design as compositions can be modified depending on the degradation mechanisms. Typically an overlayer coating as MCrAlY exhibits a two-phase $\beta+\gamma$ microstructure. The presence of the $\gamma$-phase increases the ductility of the coating, thereby improving thermal fatigue resistance. MCrAlY's when used in land-based gas turbine applications contain nickel or cobalt. Chromium (Cr) is present to provide hot corrosion resistance. The concentration of Cr added is limited with respect to the specific alloy composition, as well as its capability to form Cr-rich phases within the coating. Cobalt (Co) is incorporated into the overlayer coating to provide superior resistance to corrosion. Aluminum (Al) when added in concentrations of 10-12 wt %, enhances oxidation life. Higher concentrations of Al reduce the ductility of the substrate metal. Yttrium (Y) enhances adherence of the oxide layer. The primary role of Y is its reaction with S to prevent sulfur segregation to the oxide layer which is detrimental to scale or coating adhesion. Alternately, addition of silicon (Si) improves cyclic oxidation resistance, but reduces the melting point of the coating. Rhenium (Re) when incorporated into the bond coat overlayer improves isothermal or cyclic oxidation resistance, and thermal cyclic fatigue. Tantalum (Ta) increases oxidation resistance.

In order for a TBC to remain effective throughout the planned life cycle of the component it protects, it is important that the TBC has and maintains a low thermal conductivity throughout the life of the component, including during high temperature excursions. However, the thermal conductivities of TBC materials such as YSZ are known to increase over time when subjected to the operating environment of a gas turbine engine. As a result, TBC's for gas turbine engine components are often deposited to a greater thickness than would otherwise be necessary. Alternatively, internally cooled components such as blades and nozzles must be designed to have higher cooling flow. Both of these solutions are undesirable for reasons relating to cost, component life and engine efficiency. As a result, it can be appreciated that further improvements in TBC technology are desirable, particularly as TBC's are employed to thermally insulate components intended for more demanding engine designs.

Ceramic Top Coat—Thermal Barrier Coating

Top Coat

TBC top coat materials are typically ceramic materials and particularly zirconia ($ZrO_2$) that is partially or fully stabilized by yttria ($Y_2O_3$), magnesia (MgO), ceria ($CeO_2$), calcia (CaO), scandia ($Sc_2O_3$) or other oxides. Binary yttria-stabilized zirconia (YSZ) is widely used as a TBC top coat material because of its high temperature capability, low thermal conductivity and erosion resistance in comparison to zirconia stabilized by other oxides, e.g., ceria-stabilized zirconia, which exhibits poorer erosion resistance as a result of being relatively soft. YSZ is also preferred as a result of the relative ease with which it can be deposited by plasma spraying, flame spraying and physical vapor deposition (PVD) techniques. In plasma spraying processes, the coating material is typically in the form of a powder that is melted by a plasma as it leaves a spray gun. As a result, a plasma-sprayed TBC is formed by a buildup of molten "splats" and has a microstructure characterized by irregular flattened grains and a degree of inhomogeneity and porosity. TBC's top coats employed in the highest temperature regions of gas turbine engines are often deposited by electron beam physical vapor deposition (EB-PVD), which yields a columnar, strain-tolerant grain structure that is able to expand and contract without causing damaging stresses that lead to spallation. Similar columnar microstructures can be produced using other atomic and molecular vapor processes, such as sputtering (e.g., high and low pressure, standard or collimated plume), ion plasma deposition, and all forms of melting and evaporation deposition processes (e.g., cathodic arc, laser melting, etc.).

Current thermal barrier coating (TBC) technology not only limits heat transfer through the coating, but also protects engine components from oxidation and hot corrosion. A 1-200 µm thick TBC coating can reduce temperature from the external surface of the coating to the superalloy interface by up to 200° C. The TBC can reduce the need for blade cooling by about 36% while maintaining identical creep life of the substrate.

During operation, the TBCs are exposed to various thermal and mechanical loads as thermal cycling, high and low cycle fatigue, and high temperature erosion. Due to reliability issues, the thickness of the coatings is limited in most applications to 500 µm. Increasing the coating thickness increases the risk of coating failure and leads to reduced coating life. The failure mechanisms that cause TBC coating spallation differ from traditional thinner coatings. The major reason for traditional TBC failure and coating spallation in gas turbines is considered to typically be related to bond coat oxidation. When the thickness of the thermally grown oxide (TGO) exceeds a certain limit, it induces critical stresses within the coating, which leads to failure. The thermally grown oxide (TGO) is formed by the oxidation of the bond coat layer when temperatures exceed 700° C. leads to the formation of the 1-10 µm thick thermally grown oxide layer. The oxidation results from the ingress of oxygen through the interconnected porosity of the ceramic top coat layer, or alternately through oxygen transport via high oxygen ionic diffusivity within the $ZrO_2$-based ceramic top coat layer. Different chemical components such as sulfur, titanium, and tantalum degrade adhesion between the bond coat and the thermally grown oxide layer, while the addition of silicon and hafnium promote adhesion between the two layers.

Thicker coatings have higher temperature gradients through the coating and thus have higher internal stresses. Although the CTE of the traditionally accepted, commercial, yttria stabilized zirconia (YSZ) coatings is close to that of the substrate material, the CTE difference between the substrate and coating induces stresses at high temperatures at the coating interface. The phase structure of YSZ is not stable above 1250° C. Also the stain tolerance of the coating can be lost rapidly by sintering if too high surface temperatures are allowed. At temperatures >1000° C., YSZ ages via shrinkage and microcrack formation. The addition of 5-15% Y to Zr stabilizes the high temperature crystalline form, thus avoiding phase transitions at the service temperature range. Cerium and/or in combination with yttria has been incorporated as a stabilizer within the zirconia matrix. As an alternate to YSZ, lanthanum-hexaaluminate has been shown to exhibit long-term stability to temperatures of 1400° C. Its composition favors platelet formation which prevents densification of the coating by post-sintering.

Application of Thermal Barrier Coatings on Superalloys

Various methods have been used for depositing ceramic coatings onto metal substrates. These include physical vapor deposition (PVD) and chemical vapor deposition (CVD) processes. Thermal spraying is a process that consists of melting a consumable (powder or wire) and projecting it as a molten particle onto the substrate. Upon impact with the substrate, the molten particle flattens and solidifies. Adhesion is initially mechanical in nature, and after further being subjected to a diffusion heat treatment, adhesion to the underlying substrate alloy is increased. A sprayed coating will have voids and oxide particles. All thermal spraying processes are sight-on-line—that is only the parts that are directly in the line of the spray are coated. Adhesion of the coating is dependent on the cleanliness of the substrate surface, its area (high roughness is desired), and the velocity of the particles. Various thermal spraying techniques include: Flame spraying: An oxyacetylene flame (2700° C.) is used to melt and project the coating fed as a wire or powder. Plasma spraying: An ionized gas plasma (1600° C.) is used to melt and propel the coating (powder). High velocity oxyfuel (HVOF): $O_2$ and $H_2$ are used with a fuel gas as methane to project the coating fed material. Low pressure plasma spraying (LPPS): This is accomplished similar to plasma spraying but done in an inert at low pressure. Vacuum plasma spray (VPS): Similar to plasma spray but done in an inert environment or under vacuum.

The two most widely used techniques for deposition of TBC top coats onto superalloy substrates are air plasma spray (APS) and electron-beam physical vapor deposition (EB PVD), both of which produce distinctively unique microstructures Impact of Water Vapor on Material Stability The presence of water vapor in air has been shown to adversely affect the selective oxidation of aluminum in superalloys (i.e., $\alpha$-$Al_2O_3$-formers: PWA 1484, MarM 247, CM 186, Rene N5), by causing more transient oxides as NiO to be formed. Some adverse effects of water vapor on selective oxidation of aluminum do occur even at temperatures as high as 1100° C. Water vapor also causes the $\alpha$-$Al_2O_3$ scale to crack and spall, particularly where the interfacial toughness between the $\alpha$-$Al_2O_3$ scale and superalloy substrate is low.

The major effect of water vapor on superalloys that are chromia-formers (i.e., IN 738; X-40) is enhanced vaporization of $Cr_2O_3$, particularly at temperatures >900° C., as well as the formation of transient oxides. These chromia-forming alloys are resistant to cyclic oxidation degradation at 700° C. with no substantial effects of water vapor. These alloys are degraded rather severely at 900° C. This occurs due to cracking and spalling of the $Cr_2O_3$ scales which is exacerbated in wet air due to the vaporization of $Cr_2O_3$ via the formation of hydrated chromium oxides ($CrO_2(OH)_2$).

Considering applications for superalloys in environments containing water vapor, the chromia-formers should not be used at 900° C. or above due to vaporization of $Cr_2O_3$. In the case of the alumina-forming superalloys, problems related to the development of the $\alpha$-$Al_2O_3$ scales at low temperatures such as 700° C. needs to be further addressed.

Corrosion of TBC Systems

When EB PVD ceramic-coated superalloys were exposed to sulfates and sintering agents at temperatures of 1204° C. for 16 hrs, penetration of contaminants into the intercolumnar spaces of the coating was identified. In addition, a potentially damaging reaction zone between PVD external (top) layer and the contaminants was clearly identified. Even more dramatic effects were identified after 1000 hrs of isothermal exposure of an EB PVD ceramic-coated matrix to lower temperatures (i.e., 1038° C.).

For the surface-modified PVD ceramics, failure by spallation resulted in the area between the hot zone on the trailing edge of the sample and the flame impingement zone on the leading edge of the sample. Ceramic spallation was accompanied by severe pitting of the bond coat. Where a section was completely removed, the bond coat was significantly depleted of the $\beta$-phase near the exposed surface, as well as near the interface with the base alloy. Failure occurred primarily within the thermally grown oxide layer.

A bond coat layer or a combined bond/top coat layer that provides for improved oxidation and corrosion resistance at higher temperature than present systems as well as improved water vapor stability at high temperatures would permit more efficient operation of turbine systems at higher temperature.

SUMMARY OF THE INVENTION

An object of this invention is to provide a bond coat that maintains a strong initial bond with the subtrate alloy protecting the superalloy from accelerated oxidation, and spallation of the applied surface overlayers.

Another object of this invention is to provide a bond coat composition that reduces the rate of TGO growth, and promotes adherence of the TGO.

Another object of this invention is to provide a bond coat having a lower thermal conductivity of the coating material by compositional modifications.

Another object of this invention is to reduce stresses and accumulated strain energy that promotes cracking at the bond/coat/TGO interface These and other objectives of the invention, which will become apparent from the following description, have been achieved by a novel superalloy article having a thermal barrier coating system thereon, comprising a superalloy substrate, a thermal barrier coating on the substrate, the thermal barrier coating comprising a metallic/ceramic bond coat having particles selected from the group consisting of zirconia and a yttria/zirconia alloy on the surface of substrate, a thermally grown oxide layer overlying the bond coat, and a ceramic top coat overlying the thermally grown oxide layer. The bond coat may include dispersed with aluminum particles. In addition, a coating layer can be applied to the surface of the superalloy between the bond coat and the superalloy, wherein the coating layer is selected from the group consisting of platinum, yttrium, and a combination of platinum and yttrium. The superalloy can be nickel-based or chromium based.

The bond coat may also contain yttria stabilized zirconia dispersed with aluminum particles. Alternately, other filler material may be included in the bond coat, including wherein the filler material is selected from the group consisting of alumina, zirconia, ceria, titania. Further, the filler material is selected from the group consisting of perovskites, zeolites and hexaluminates. Typically, the ceramic topcoat is yttria stabilized zirconia. The bond coat is from about 10 μm (10× $10^{-6}$ m) to about 100 μm thick. The ceramic topcoat is from about 50 μm to about 200 μm thick.

BRIEF DESCRIPTION OF THE DRAWINGS

With this description of the invention, a detailed description follows with reference being made to the accompanying figures of drawings which form part of the specification, in which like parts are designated by the same reference numbers, and of which:

FIG. 1 is a representation of the basic idea of the invention.

FIG. 2 is a representation of the superalloy of this invention.

FIG. 3 is a representation of a second embodiment of this invention.

FIG. 4 is a representation of a third embodiment of this invention.

DETAILED DESCRIPTION OF THE INVENTION

Figure 5:
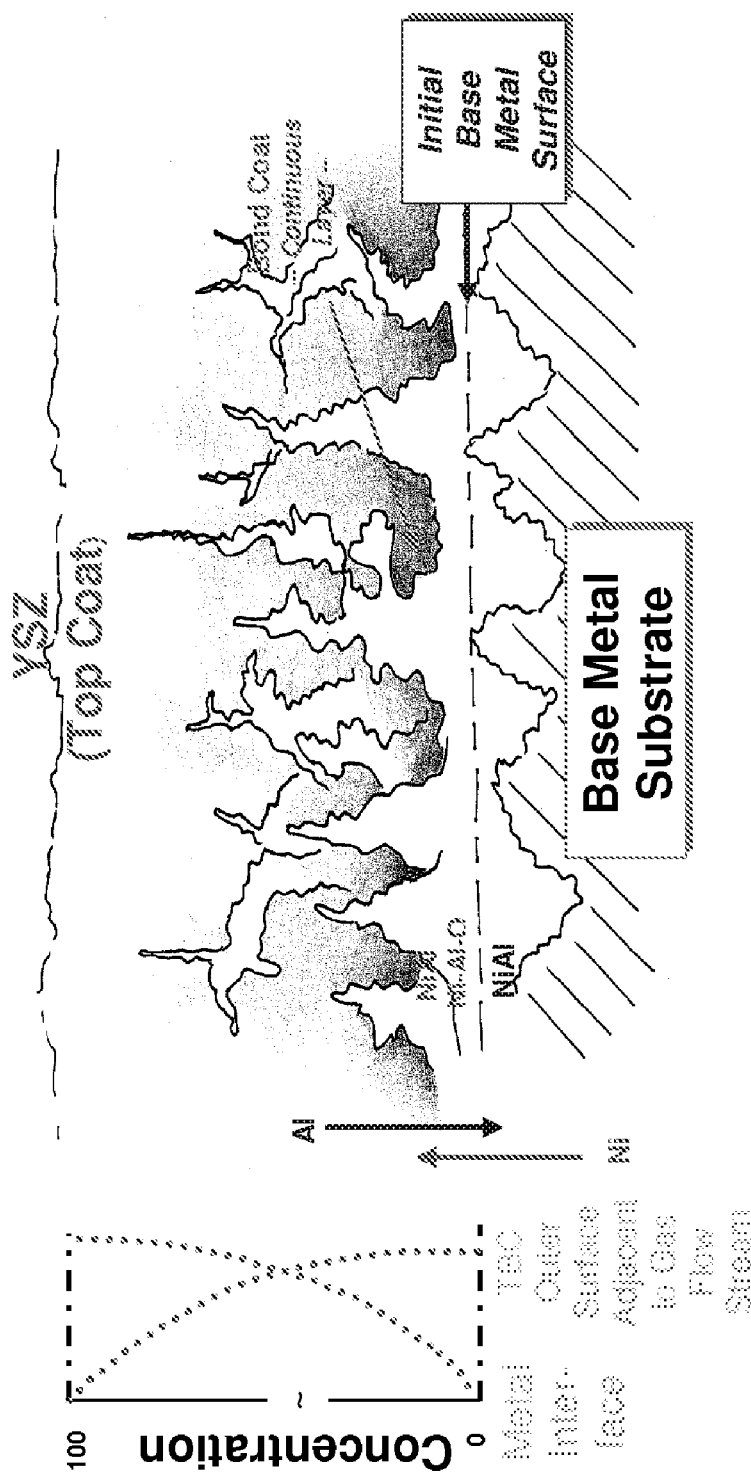
FIG. 5 is a graphical representation illustrating the variation in the concentration of Nickel and Aluminum relative to the superalloy surface.

A bond coat/TBC forming an Al, Ni, and/or NiAl (nickel aluminide) intermetallic network containing YSZ (yttria stabilized zirconia), applied as either a homogeneous or variable gradient along the surface of a superalloy or single crystal metal substrate to the base of the YSZ TBC, or wherein the bond coat functions as the TBC on the outer metallic surface.

Solely as a bond coat, the concentration of Al ranges from about 10 to about 70 weight percent; the concentration of Ni ranges from about 0 to about 50 weight percent; and the concentration of YSZ ranges from about 0 to about 40 weight percent. Present as a binder phase, the concentration of Cr ranges from about 1 to about 5 weight percent, more preferably about 2.5 weight percent. If present, the concentration of Pt ranges from about 0.01 to <10 weight percent. Platinum (Pt) can be dispersed throughout the bond coat, or localized at the bond coat/base metal substrate interface.

As a graded bond coat/TBC, the concentration of YSZ ranges from about 0 to about 40 weight percent from the base metal interface to about 100 weight percent at the outer surface of the coating.

The invention focuses on the generation of a mechanically adherent, oxidation resistant, thermal barrier coating for advanced combustion turbine applications as applied to the standard coating shown in FIG. 1. This disclosure addresses the issue of providing a metallic-ceramic overlay coating that potentially serves as an interface or bond coat layer to provide enhanced oxidation resistance to the underlying superalloy substrate via the formation of a diffusion barrier regime within the supporting base material. Variations to the metallic-ceramic matrix can include, but is not limited to standard filler materials (i.e., alumina, zirconia, ceria, titania, etc.), but can also extend to complex oxides as perovskites, zeolites, hexa-aluminates, and the like. (Prior Art). FIG. 1 illustrates a standard metallic ceramic coating containing a mixture of aluminum (large blue spheres) and ceramic (small yellow spheres).

In order to modify the current oxidation resistant coating zirconia particles and/or a combination of yttria/zirconia (yellow/green) are solely or dispersed with aluminum (large blue spheres) particles, and applied to the surface of superalloy (FIG. 2). An initial coating layer containing platinum particles can be applied to the surface of the superalloy. Both yttrium and/or platinum (small black spheres) may be homogeneously incorporated into the coating architecture, or applied as through the formation of a gradient. In this manner to Enhanced adherence characteristics of the applied layer at the superalloy surface result via the formation of Pt—Al—Ni and/or Ni—Al interface phases.

The inclusion of YSZ particles within the metallic-ceramic matrix inherently provides transitional compatibility with the overlayer YSZ top coat chemistry.

As a result of dispersion of aluminum particles within the applied metallic-ceramic layer, oxidation of the metallic particles is expected to occur at high operating temperatures in an oxidizing gas environment. Due to the inherent porosity within the applied metallic-ceramic coating, limited increase in the overall thickness of the coating is expected to result while oxidation resistance is provided to and maintained along the surface of the underlying superalloy. Unlike an aluminizing process whereby a continuous alumina layer results on the surface of an alloy, an alumina-enhanced yttria-stabilized zirconia layer is formed along the outer surface of the superalloy.

A recommended thickness of applied metallic-ceramic coating is about 10-100 μm, with a preferred nominal thickness of 10-50 μm in order to retain adherence of the coating to the superalloy surface.

Traditional low cost, spray techniques that are used by Coatings Technology Inc. (CTI) and Coatings for Industry (CFI) may be used for the application of the metallic-ceramic TBC bond coat onto the superalloy surface.

In order to complete the TBC architecture, a YSZ layer is incorporated along the outer surface of the metallic-ceramic layer (FIG. 3), pending the requirement to further reduce the heat transferred from the process gas stream to the superalloy. Application of the external YSZ or top coat can result from spray coating techniques similar to those used for application of the metallic-ceramic or bond coat interface layer, or via APS, EB PVD, and the like.

A recommended thickness of applied top coat YSZ layer is about (~) 50-200 μm, with a preferred nominal thickness of ~10-100 μm in order to retain adherence of the coating to the metallic-ceramic and superalloy surfaces.

An additional variation to the metallic-ceramic or bond coat layer is the inclusion of nickel particles (grey spheres) within the aluminum-yttria-zirconia-platinum matrix (FIG. 4). In this fashion, an internal network of nickel aluminide and/or spinel may be formed as a lattice or cage in which to hold and retain the ceramic filler matrix. Point contact between aluminum and nickel particles, and/or partial and/or complete reaction between adjoining particles can lead to the formation of the nickel aluminide and/or spinel structure. The overall variation of the continuously varying YSZ gradient with the nickel aluminide gradient is shown in FIG. 5.

Supporting Test Data

Bond coats of said compositions have been applied to the surface of high nickel-based alloys. Success has been demonstrated in bench-scale furnace testing, identifying retention and adherence of the coatings after being subjected to thermal ramp rates of 100° C./min, wherein temperatures of 1000° C. were achieved in 10 min. Each material system was maintained at 1000° C. for periods of 8 hrs, and subsequently subjected to similar severe cooling rates. After completion of 10 heat-up/cool-down cycles, adherence of the coating was demonstrated.

Disclosed Concept Attributes

The metallic-ceramic TBC bond coating:
1. Serves an interface or bond coat layer to provide enhanced oxidation resistance to the underlying superalloy or single crystal substrate via the formation of a diffusion barrier regime within the supporting base material.
2. Provides excellent surface adhesion to the underlying base metal substrate.
3. Adhesion or adherence of the metallic-ceramic bond coat layer may be further enhanced through the addition of platinum at the bond coat/superalloy or single crystal interface, as well as within the bond coat layer.
4. Mitigates internal oxidation along grain boundaries within the superalloy or single crystal metal, thus maintaining the high temperature strength and ductility of the metal substrate.
5. Reduces volatilization and transport of chromium-enriched gas phase species, in process gases containing water vapor, thus retaining the stability and dimensional tolerances of the component.
6. Limits the growth of a continuous thermally grown oxide (TGO) layer that has been primarily considered to be the principal cause for failure of existing TBC systems.
7. Is compositionally compatible with traditional yttria-stabilized zirconia (YSZ) top coats, thus assisting adherence and limiting debonding and/or spallation of the top coat during operational use.
8. Can be applied via low cost commercial spraying techniques, followed by low temperature curing.
9. Is applied to thicknesses of ~10-100 μm, with a preferred nominal thickness of ~10-50 μm in order to retain adherence of the coating to the base metal surface.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope of the invention be determined by the scope of the appended claims.

The invention claimed is:

1. A metallic article having a thermal barrier coating system thereon, comprising:
   a metallic substrate having a composition comprised of nickel; and
   a thermal barrier coating on a surface of the metallic substrate, the thermal barrier coating comprised of,
      a metal-ceramic mixture, the metal-ceramic mixture comprised of yttria stabilized zirconia dispersed with aluminum particles,
      nickel-aluminum intermetallic phases interposed between the metal-ceramic mixture and the surface of the metallic substrate, the nickel-aluminum intermetallic phases formed by a diffusion process between the metal-ceramic mixture and the metallic substrate.

2. The metallic article of claim 1 where the thermal barrier coating is further comprised of platinum particles and a (Ni, Pt)Al phase formed during the diffusion process.

3. The metallic article of claim 1 wherein the thermal barrier coating is further comprised of a filler material.

4. The metallic article of claim 3, wherein the filler material is selected from the group consisting of alumina, zirconia, ceria, and titania.

5. The metallic article of claim 3, wherein the filler material is selected from the group consisting of perovskites, zeolites, and hexaluminates.

6. The metallic article of claim 1 further comprising a ceramic topcoat comprised of yttria stabilized zirconia on the thermal barrier coating, such that the thermal barrier coating is between the ceramic topcoat and the surface of the metallic substrate.

7. The metallic article of claim 1 where the thermal barrier coating is further comprised of thermally grown oxides established during manufacturing or service life.

8. The metallic article of claim 1 where the thermal barrier coating is further comprised of nickel particles.

9. The metallic article of claim 1 where the yttria stabilized zirconia comprising the metal-ceramic mixture has an increasing concentration relative to the aluminum particles with increasing distance away from the surface of the metallic substrate surface in a direction substantially normal to the surface of the metallic substrate, where the increasing concentration relative to the aluminum particles is established during an application of the yttria stabilized zirconia dispersed with aluminum particles to the surface of the metallic substrate prior to the diffusion process.

10. A metallic article having a thermal barrier coating system thereon, comprising:
    a metallic substrate having a composition comprised of nickel; and
    a thermal barrier coating on a surface of the metallic substrate, the thermal barrier coating comprised of,
       a metal-ceramic mixture, the metal-ceramic mixture comprised of yttria stabilized zirconia dispersed with aluminum particles and a filler material,
       nickel-aluminum intermetallic phases, the nickel-aluminum intermetallic phases formed by a diffusion process between the metal-ceramic mixture and the metallic substrate; and
       thermally grown oxides established during manufacturing or service life, the thermally grown oxides comprised of aluminum oxides.

11. The metallic article of claim 10 where the thermal barrier coating is further comprised of platinum particles and a (Ni, Pt)Al intermetallic phase formed during the diffusion process.

12. The metallic article of claim 10 wherein the filler material is selected from the group consisting of alumina, zirconia, ceria, and titania.

13. The metallic article of claim 10, wherein the filler material is selected from the group consisting of perovskites, zeolites, and hexaluminates.

14. The metallic article of claim 10 wherein the thermal barrier coating is further comprised of nickel particles.

15. The metallic article of claim 10 further comprising a ceramic topcoat comprised of yttria stabilized zirconia on the thermal barrier coating, such that the thermal barrier coating is between the ceramic topcoat and the metallic substrate.

16. The metallic article of claim 15 where the yttria stabilized zirconia comprising the metal-ceramic mixture has an increasing concentration relative to the aluminum particles with increasing distance away from the surface of the metallic substrate in a direction substantially normal to the surface of the metallic substrate, where the increasing concentration relative to the aluminum particles is established during an application of the yttria stabilized zirconia dispersed with aluminum particles to the surface of the metallic substrate prior to the diffusion process.

17. A metallic article having a thermal barrier coating system thereon, comprising:

a metallic substrate having a composition comprised of nickel;

a thermal barrier coating on a surface of the metallic substrate, the thermal barrier coating comprised of, a metal-ceramic mixture, the metal-ceramic mixture comprised of yttria stabilized zirconia dispersed with aluminum particles and a filler material, where the yttria stabilized zirconia comprising the metal-ceramic mixture has an increasing concentration relative to the aluminum particles with increasing distance away from the surface of the metallic substrate in a direction substantially normal to the surface of the metallic substrate, nickel-aluminum intermetallic phases, the nickel-aluminum intermetallic phases formed by a diffusion process between the metal-ceramic mixture and the metallic substrate;

thermally grown oxides established during manufacturing or service life, the thermally grown oxides comprised of aluminum oxides; and a ceramic topcoat comprised of yttria stabilized zirconia on the thermal barrier coating, such that the thermal barrier coating is between the ceramic topcoat and the metallic substrate.

18. The metallic article of claim 17 where the thermal barrier coating is further comprised of platinum particles and a (Ni, Pt)Al intermetallic phase formed during the diffusion process.

19. The metallic article of claim 17 where the thermal barrier coating is further comprised of nickel particles.

20. The metallic article of claim 17 where the increasing concentration of yttria stabilized zirconium relative to the aluminum particles is established during an application of the yttria stabilized zirconia dispersed with aluminum particles to the surface of the metallic substrate prior to the diffusion process.

\* \* \* \* \*